(12) United States Patent
Sic et al.

(10) Patent No.: US 10,005,361 B1
(45) Date of Patent: Jun. 26, 2018

(54) MOBILE COMPUTER RETAINER FOR DISPLAY OF VEHICLE OPERATIONAL DATA

(71) Applicant: Ford Global Technologies, LLC, Dearborn, MI (US)

(72) Inventors: Steven Sic, Troy, MI (US); Adrian Romero Regalado, Cuautitlán Izcalli (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days. days.

(21) Appl. No.: 15/439,250

(22) Filed: Feb. 22, 2017

(51) Int. Cl.
| | |
|---|---|
| *B60K 37/00* | (2006.01) |
| *B60K 37/02* | (2006.01) |
| *B60R 11/02* | (2006.01) |
| *B60R 16/03* | (2006.01) |
| *H04W 76/02* | (2009.01) |
| *B60R 11/00* | (2006.01) |
| *G06F 3/0482* | (2013.01) |
| *G06F 3/0484* | (2013.01) |
| *G06F 3/0488* | (2013.01) |

(52) U.S. Cl.
CPC .......... *B60K 37/02* (2013.01); *B60R 11/0252* (2013.01); *B60R 16/03* (2013.01); *H04W 76/02* (2013.01); *B60K 2350/352* (2013.01); *B60K 2350/357* (2013.01); *B60R 2011/001* (2013.01); *B60R 2011/0005* (2013.01); *G06F 3/0482* (2013.01); *G06F 3/0488* (2013.01); *G06F 3/04847* (2013.01)

(58) Field of Classification Search
CPC .............. B60K 37/02; B60K 2350/352; B60K 2350/357; B60R 11/0252; B60R 16/03; B60R 2011/0005; B60R 2011/001; H04W 76/02; G06F 3/0482; G06F 3/04847; G06F 3/0488

USPC .......... 701/70; 320/37.12; 307/9.1; 710/303
See application file for complete search history.

(56) References Cited

U.S. PATENT DOCUMENTS

| | | |
|---|---|---|
| 6,354,649 B1 | 3/2002 | Lee |
| 7,274,564 B2 | 9/2007 | Rossini |
| | (Continued) | |

FOREIGN PATENT DOCUMENTS

WO 2012155047 A2 11/2012

*Primary Examiner* — Marthe Y Marc-Coleman
(74) *Attorney, Agent, or Firm* — Vichit Chea; Price Heneveld LLP (57) ABSTRACT

A vehicle including a mobile computer retainer disposed directly forward of the operator's seat. The mobile computer retainer holds a mobile computer, which displays the vehicle operational data (speed, fuel remaining, etc.) of the vehicle operator's choosing to the vehicle operator. The mobile computer retainer allows the vehicle operator to customize the display of vehicle operational data, something that dashboard instrument clusters heretofore have not allowed. The vehicle operator can customize the display of vehicle operational data using a mobile device that the vehicle operator may use in his or her home. The mobile computer retainer can include at least one channel retaining member that at least partially surrounds the mobile computer. The mobile computer retainer can include retaining arms pivotally connected to a horizontal base that lock into a position retaining the mobile computer when the mobile computer is pressed down toward the horizontal base.

20 Claims, 10 Drawing Sheets

(56) References Cited

U.S. PATENT DOCUMENTS

| | | | |
|---|---|---|---|
| 9,162,574 B2 | 10/2015 | Kolodziej | |
| 2005/0270146 A1* | 12/2005 | Enya | B60Q 5/00 |
| | | | 340/438 |
| 2009/0128307 A1 | 5/2009 | Hentsch et al. | |
| 2014/0006669 A1* | 1/2014 | Klein | B60R 11/02 |
| | | | 710/303 |
| 2014/0047347 A1* | 2/2014 | Mohn | G08G 1/00 |
| | | | 715/738 |
| 2014/0223065 A1 | 8/2014 | Jolda et al. | |
| 2014/0257623 A1* | 9/2014 | Carl | G07C 5/008 |
| | | | 701/29.4 |
| 2016/0297374 A1 | 10/2016 | Prazeres et al. | |

\* cited by examiner

MOBILE COMPUTER RETAINER FOR DISPLAY OF VEHICLE OPERATIONAL DATA

FIELD OF THE INVENTION

The present invention generally relates to the display of vehicle operational data to a vehicle operator.

BACKGROUND OF THE INVENTION

A vehicle operator spends a lot of time facing the vehicle's dashboard. The dashboard houses the instrumentation, sometimes referred to as an instrument cluster, upon which the vehicle operator relies while operating the vehicle. Common instrument clusters contain a speedometer, an odometer, and a fuel gauge. A vehicle operator becomes very familiar with the instrument cluster.

Despite the high level of interaction that a vehicle operator has with the instrument cluster, the vehicle operator typically cannot easily customize the display of the instrument cluster. In normal circumstances, a vehicle operator must accept the design of and the information provided by the instrument cluster. Altering the instrument cluster that the vehicle manufacturer provides by replacing instruments and background paneling is an expensive and laboring task. For most vehicle operators, customization in this manner is not a viable option.

SUMMARY OF THE INVENTION

According to one aspect of the present invention, a vehicle comprises an operator's seat and a mobile computer retainer disposed directly forward of the operator's seat. The vehicle provides a mobile computer retainer in place of the typical instrument cluster and the vehicle communicates vehicle operational data (speed, distance, etc.) to the mobile computer, which then displays the data in whatever manner the vehicle operator chooses. In other words, the vehicle operator can use his or her personal mobile computer, such as a tablet, to display the information that an instrument cluster typically provides. The vehicle operator finally can control the appearance of vehicle operational data, in an inexpensive and easy way.

Embodiments of the first aspect of the invention can include any one or a combination of the following features:
  the vehicle further comprising a steering column, wherein the mobile computer retainer is disposed above the steering column;
  the vehicle further comprising a mobile computer communicator;
  the mobile computer communicator comprising a radio wave receiver and a radio wave emitter;
  the mobile computer communicator comprising a charging port;
  the mobile computer retainer comprising a horizontal base and a first retaining arm pivotally connected to the horizontal base, the first retaining arm comprising a transversely extending end portion;
  the first retaining arm further comprising a charging port for a mobile computer;
  the first retaining arm capable of pivoting to a first position and a second position, wherein, in the first position, the transversely extending end portion is substantially parallel to the horizontal base, and, in the second position, the transversely extending end portion is not parallel to the horizontal base;
  the mobile computer retainer further comprising a second retaining arm pivotally connected to the horizontal base, the second retaining arm comprising a transversely extending end portion, the second retaining arm capable of pivoting to the first position and the second position;
  the first retaining arm and the second retaining arm each comprising a transversely extending pivot portion, wherein, in the first position, the transversely extending pivot portion is substantially parallel to the horizontal base; and
  a dashboard at least partially enclosing the mobile computer retainer, the dashboard comprising a top and an entrance to the mobile computer retainer disposed through the top.

According to another aspect of the present invention, a method of customizing the manner in which vehicle operational data is displayed to a vehicle operator comprises: selecting a mobile computer comprising a display screen and application software enabling the display screen to display vehicle operational data of the vehicle operator's choosing; selecting on the mobile computer the vehicle operational data to be displayed and the manner in which it is displayed; placing the mobile computer into a mobile computer retainer disposed directly forward of an operator's seat of a vehicle; allowing the mobile computer communicator to communicate with the mobile computer; and displaying the vehicle operational data on the display screen. The vehicle operator now has a novel method of customizing the manner in which vehicle operational data is displayed.

Embodiments of the second aspect of the invention can include any one or a combination of the following features:
  causing the vehicle to move, wherein the vehicle operational data comprises a speed at which the vehicle is moving;
  causing the vehicle to move, wherein the vehicle further comprises an energy source, wherein the vehicle operation data is at least one of the following: a speed at which the vehicle is moving; a distance which the vehicle has moved; and an amount of energy source within the vehicle;
  the mobile computer retainer comprising at least one channel retaining member, wherein placing the mobile computer into the mobile computer retainer comprises placing the mobile computer into the at least one channel retaining member so that the at least one channel retaining member partially surrounds the mobile computer;
  the vehicle further comprising a dashboard at least partially enclosing the mobile computer retainer, the dashboard comprising a top and an entrance to the mobile computer retainer disposed through the top, wherein placing the mobile computer into the mobile computer retainer comprises inserting the mobile computer through the entrance; the mobile computer further comprising a charging port receiver; the mobile computer retainer comprising a horizontal base and a first retaining arm pivotally connected to the horizontal base, the first retaining arm comprising a transversely extending end portion, a transversely extending pivot portion, and a charging port for the mobile computer, the first retaining arm capable of pivoting to a first position and a second position, wherein, in the first position, the transversely extending end portion is substantially parallel to the horizontal base, and, in the second position, the transversely extending end portion is not parallel to the horizontal base; wherein placing the mobile computer into the mobile computer retainer further comprises: pushing the mobile computer onto the transversely extending pivot portion when the first retaining arm is in the second position; causing the first retaining arm to move toward the first position; causing the charging port to enter the charging port receiver; and causing the first retaining arm to settle in the first position, wherein the transversely extending end portion partially surrounds the mobile computer to secure it into place;

the vehicle further comprising a mobile computer communicator comprising a radio wave receiver and a radio wave emitter, wherein allowing the mobile computer communicator to communicate with the mobile computer comprises the radio wave emitter emitting radio waves to the mobile computer and the mobile computer emitting radio waves to the radio wave receiver; and removing the mobile computer from the vehicle and connecting the mobile computer to a computer network access point located within a residence of the vehicle operator.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
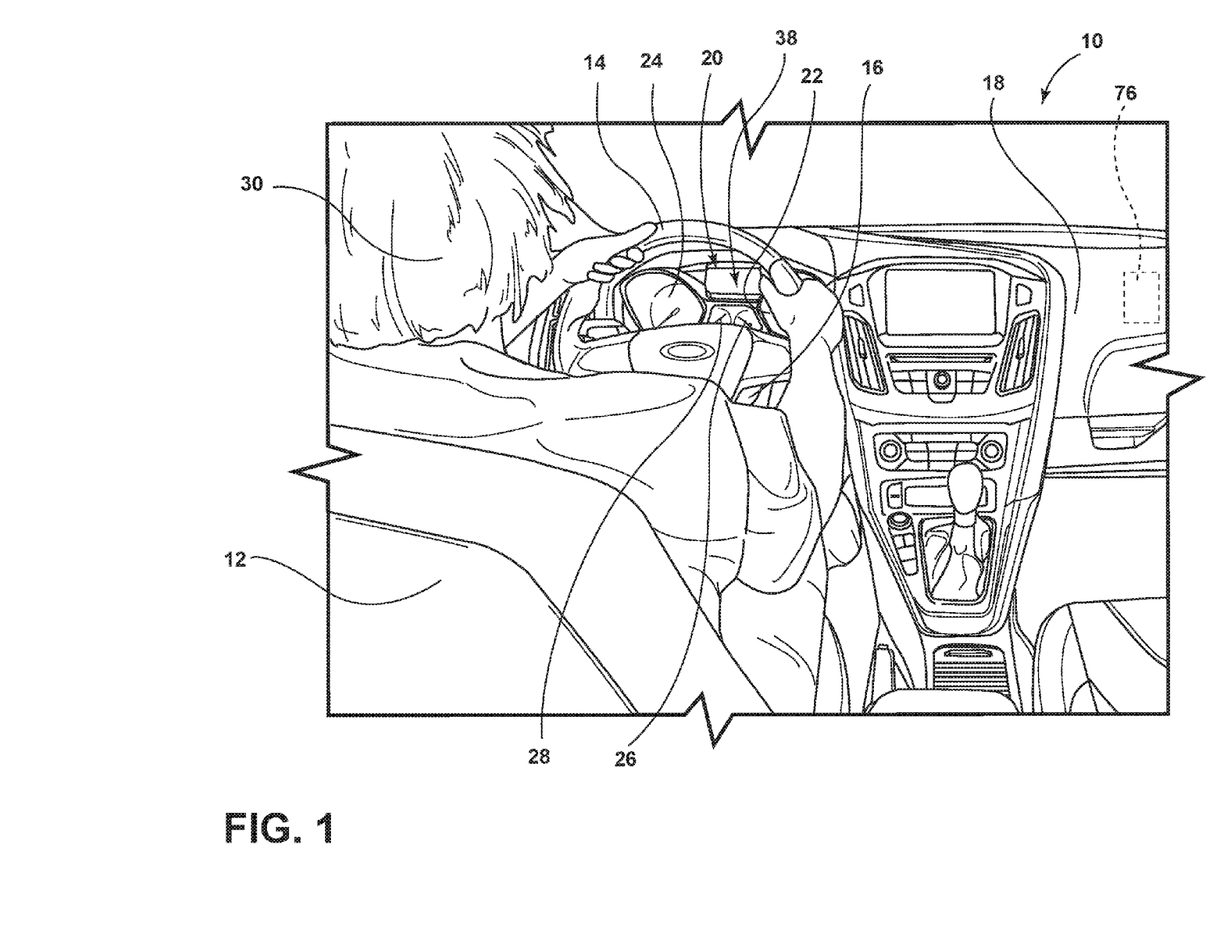
FIG. 1 is a perspective view of an interior cockpit area of a vehicle showing an instrument cluster provided by the vehicle manufacturer.

In FIG. 1, an interior cockpit area of a vehicle 10 is illustrated, showing an operator's seat 12, a steering wheel 14 disposed in front of the operator's (driver's) seat 12, a steering column 16 connecting the steering wheel 14 to the steering mechanism (not shown), and an instrument cluster 20 disposed behind the steering wheel 14 within the dashboard 18. This instrument cluster 20 contains a speedometer 22, a tachometer 24, a fuel gauge 26, and an engine temperature gauge 28. Typical instrument clusters also contain an odometer (not shown).

The instrument cluster 20 thus displays vehicle operational data 38 to the vehicle operator 30, when the vehicle operator 30 is sitting in the operator's seat 12. The speedometer 22 displays the speed of the vehicle 10, the tachometer 24 displays the revolutions per minute of the engine, and so on. A vehicle operational data collection system 76 within the vehicle 10 collects the vehicle operational data 38 and outputs the data to the instrument cluster 20, which then displays the data.

The vehicle operator 30, however, typically cannot readily customize the appearance of the instrument cluster 20 on many vehicles. Perhaps the vehicle operator 30 is concerned primarily about the vehicle's speed and wants the speedometer 22 to appear larger. Perhaps the vehicle operator 30 only wants vehicle speed to be displayed when the vehicle is travelling faster than the speed limit. Perhaps the vehicle operator 30 wants fuel information to take display precedence when the fuel supply is below a predetermined level. Perhaps the vehicle operator 30 likes the color red and wants all vehicle operational data to be displayed in a red color. Perhaps the vehicle operator 30 is inspired to drive more safely when vehicle operational data is displayed over a background picture of the family of the vehicle operator 30. The display preferences of the vehicle operator 30 vary from person to person. However, the vehicle operator 30 must typically accept the instrument cluster 20 that the vehicle 10 manufacturer has provided.

Figure 2:
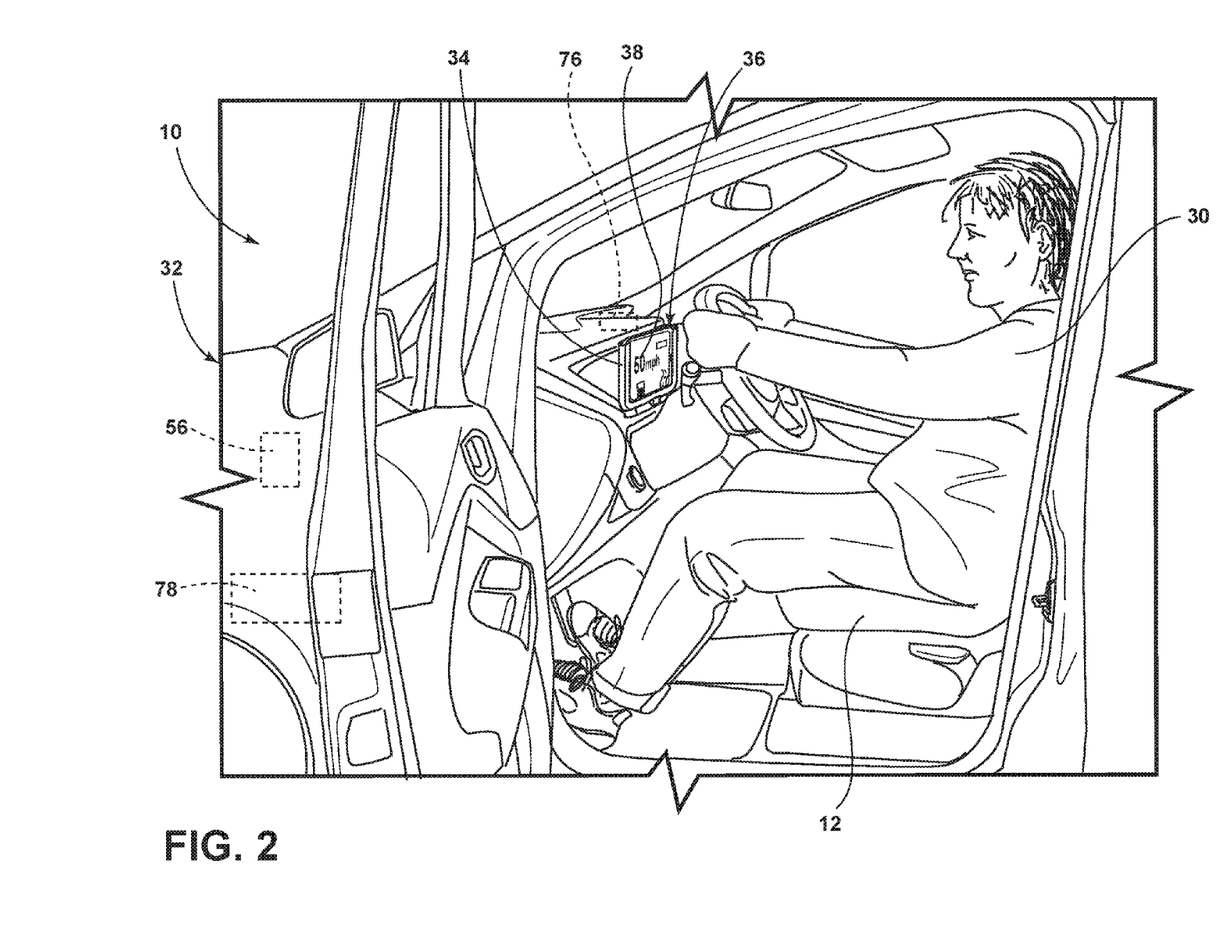
FIG. 2 is a side perspective view of a vehicle incorporating an embodiment of a mobile computer retainer of the present disclosure disposed directly forward of the operator's seat.

In FIG. 2, an embodiment solving this inability-to-customize problem is illustrated. There illustrated is a vehicle 10 comprising an operator's seat 12, a front 32, and a mobile computer retainer 34 retaining a mobile computer 36. The vehicle 10 can be any transportation device that a vehicle operator 30 uses to transport the vehicle operator 30. For example, the vehicle 10 can be an automobile that transports the vehicle operator 30 using a road system. The vehicle 10 can have self-driving capabilities or can be fully operated by the vehicle operator 30. The front 32 of the vehicle 10 is the forward facing part of the vehicle 10 from the perspective of the vehicle operator 30 when the vehicle operator 30 is sitting in the operator's seat 12. The mobile computer retainer 34 is disposed between the operator's seat 12 and the front 32, directly forward of the operator's seat 12.

The mobile computer retainer 34 retains a mobile computer 36 when the vehicle is in use. The mobile computer retainer 34 prevents the mobile computer 36 from changing location so drastically that the vehicle operator 30 can no longer view the vehicle operational data 38 that the mobile computer 36 is displaying. For example, the mobile computer retainer 34 prevents the mobile computer 36 from falling to the floor of the vehicle 10.

Figure 3:
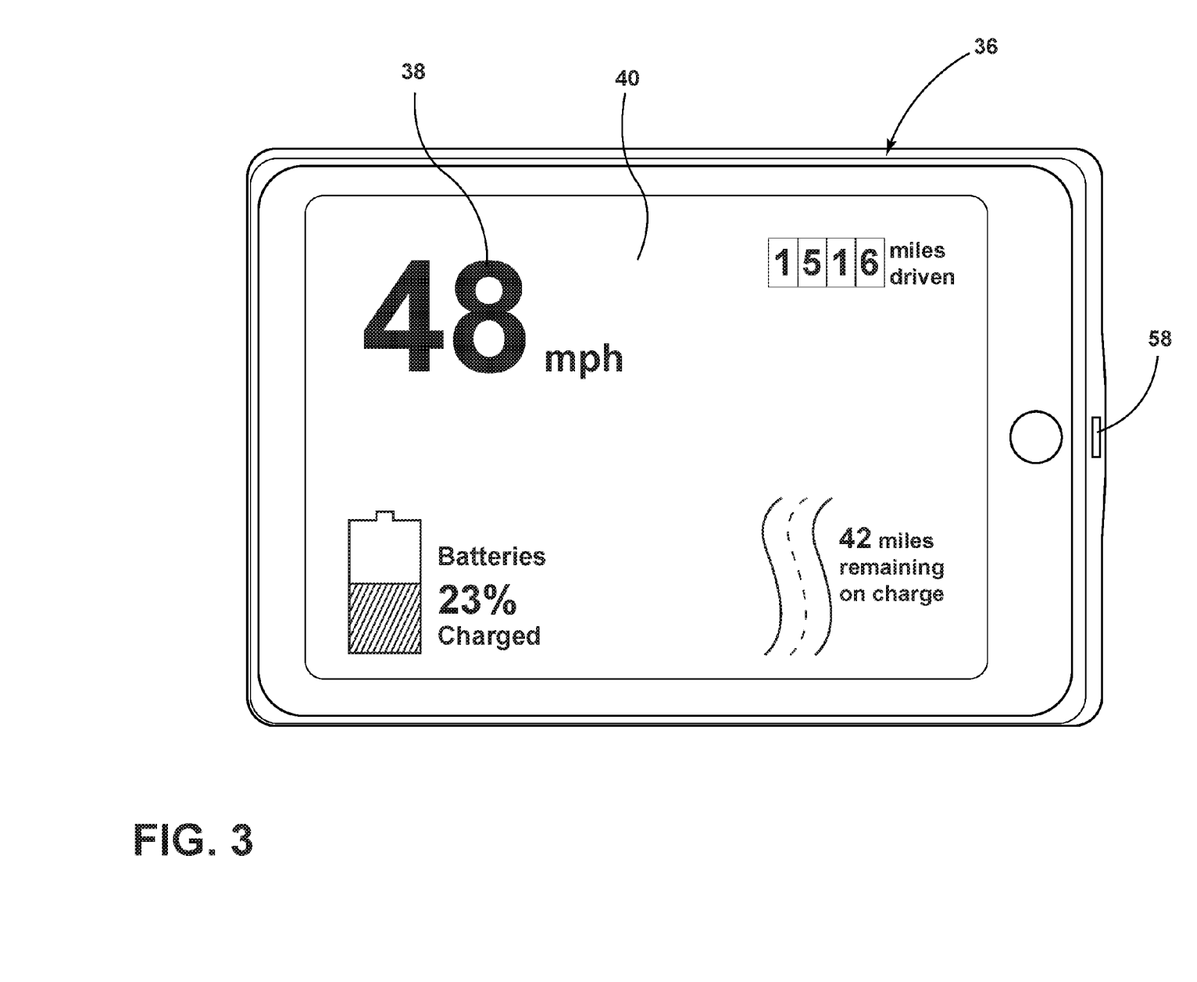
FIG. 3 is a front view of a mobile computer for use with the mobile computer retainer.

In FIG. 3, an example mobile computer 36 is shown. In this example, the mobile computer 36 comprises a display screen 40, which can display various vehicle operational data 38. A "mobile computer" is a transportable device that can receive data and display the data on the screen. An example of a mobile computer 36 is a tablet computer. An example tablet computer is the iPad Pro, which is distributed by Apple Inc. Another example tablet computer is the Surface Pro 3, which is distributed by Microsoft Corporation. Another example of a mobile computer 36 is a smartphone computer, such as the iPhone 7, which is distributed by Apple Inc. The mobile computer 36 contains and utilizes application software that enables the display screen 40 to display the vehicle operational data 38 that the vehicle operator 30 chooses, and the manner in which the vehicle operator 30 desires.

Figure 4:
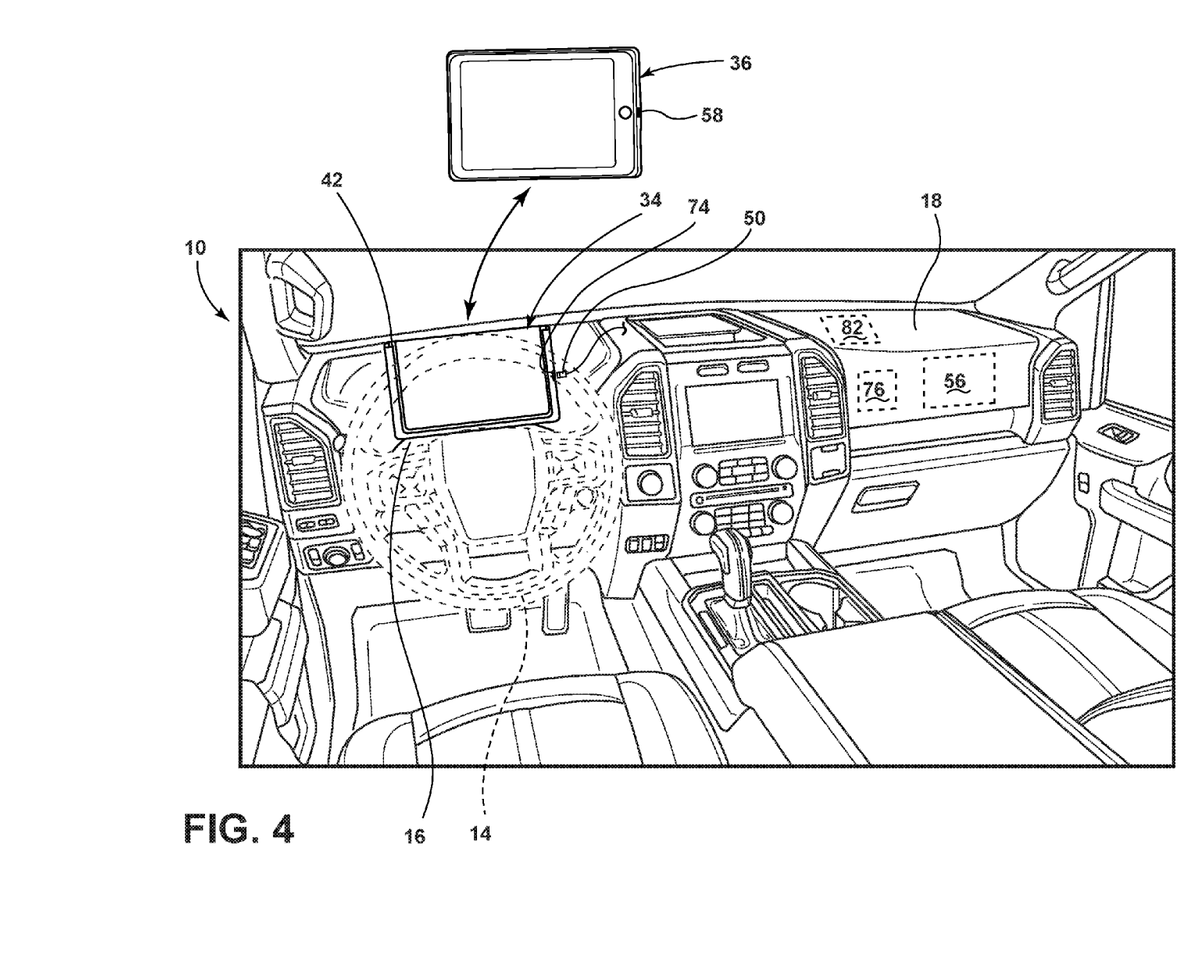
FIG. 4 is a perspective view of a vehicle dashboard and an embodiment of a mobile computer retainer of the present disclosure that includes a channel retaining member for retaining the mobile computer.

Referring to FIG. 4, an embodiment of the mobile computer retainer 34 is illustrated. In this embodiment, the mobile computer retainer 34 comprises at least one channel retaining member 42. The vehicle operator 30 (see FIG. 2) can thus insert a mobile computer 36 into the mobile computer retainer 34 and the channel retaining member 42 partially surrounds the mobile computer 36 around the edges of the mobile computer 36. The channel retaining member 42 can be made of one contiguous piece. Alternatively, the channel retaining member 42 can be divided into smaller channel retaining members spaced apart from each other. The mobile computer retainer 34 can be above the steering column 16 and behind the steering wheel 14, when viewed from the perspective of a vehicle operator 30 sitting in the operator's seat 12.

The vehicle 10 can further include a mobile computer communicator 56. The mobile computer communicator 56 can include a radio wave receiver and a radio wave emitter, to allow the vehicle's computer system controller 82 to communicate vehicle operational data 38 to the mobile computer 36. In such a circumstance, the mobile computer 36 will also incorporate a wireless radio wave receiver and radio wave emitter. Bluetooth SIG, Inc., for example, provides such radio wave communication systems and software.

The mobile computer communicator 56 can alternatively or additionally include a charging port 50. The charging port 50 can connect with the mobile computer 36 by placing the charging port 50 into a corresponding charging port receiver 58 within the mobile computer 36. The channel retaining member 42 can include a slot 74 through which the charging port 50 can be placed to reach the charging port receiver 58 of the mobile computer 36. The mobile computer communicator 56 can communicate with the mobile computer 36 through the charging port 50 connection.

Figure 5:
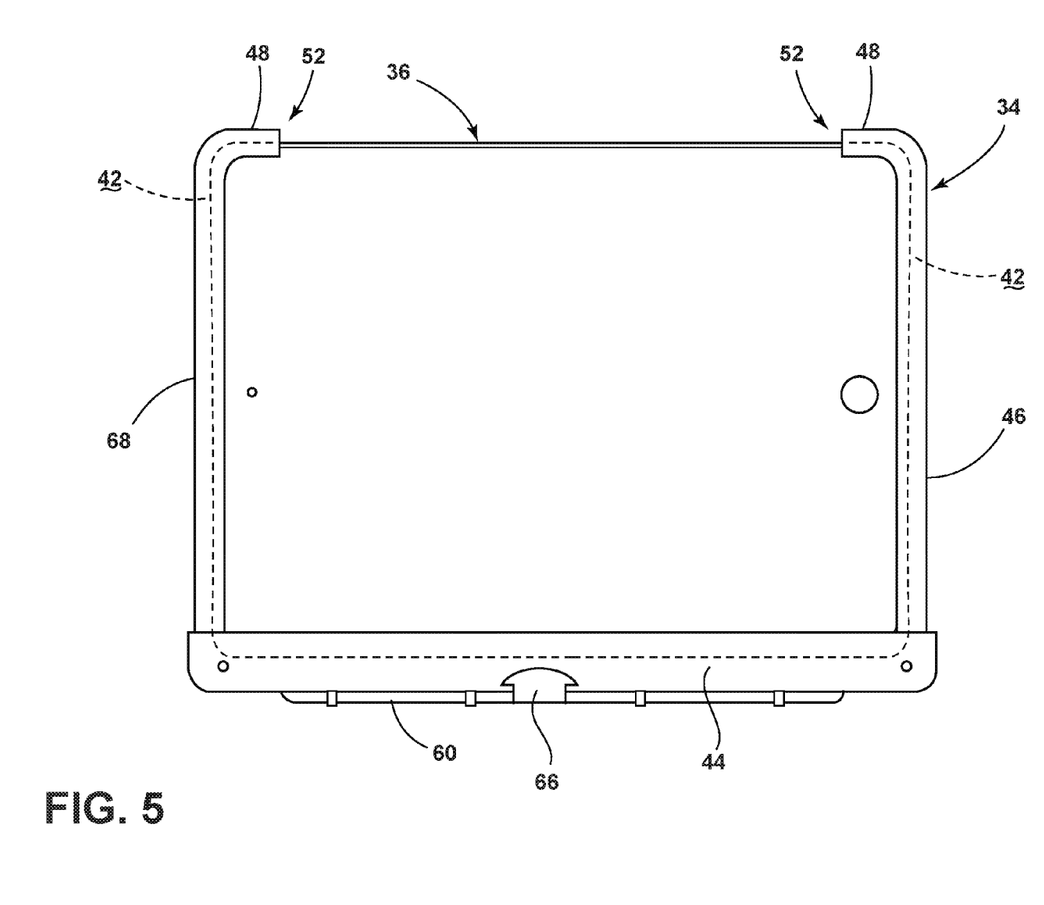
FIG. 5 is a perspective view of an embodiment of the mobile computer retainer that includes retaining arms shown in a first position retaining a mobile computer.

Referring to FIG. 5, another embodiment of the mobile computer retainer 34 is depicted. In this embodiment, the mobile computer retainer 34 comprises a horizontal base 44 and a first retaining arm 46 pivotally connected to the horizontal base 44. The first retaining arm 46 forms a channel to partially surround the mobile computer 36 and thus forms a channel retaining member 42. The first retaining arm 46 incorporates a transversely extending end portion 48 and a charging port 50 (see FIG. 6). The charging port 50 provides a physical communicative and charging connection from the mobile computer communicator 56 in the vehicle 10 to the mobile computer 36. In this figure, the first retaining arm 46 is shown in a first position 52 where the transversely extending end portion 48 is substantially parallel to the horizontal base 44. Because the transversely extending end portion 48 is substantially parallel to the horizontal base 44 and forms a channel retaining member 42, the transversely extending end portion 48 partially surrounds the mobile computer 36 to keep the mobile computer 36 in place while the vehicle 10 is moving. The first retaining arm 46 further incorporates a transversely extending pivot portion 64 (see FIG. 6). The mobile computer retainer 34 may further comprise a second retaining arm 68 pivotally connected to the horizontal base 44 at a position opposite of the first retaining arm 46. The second retaining arm 68 likewise incorporates a transversely extending end portion 48. The second retaining arm 68 is likewise capable of being in a first position 52, where the transversely extending end portion 48 is substantially parallel to the horizontal base 44. The second retaining arm 68 forms a channel to partially surround the mobile computer 36 and thus forms a channel retaining member 42.

Figure 6:
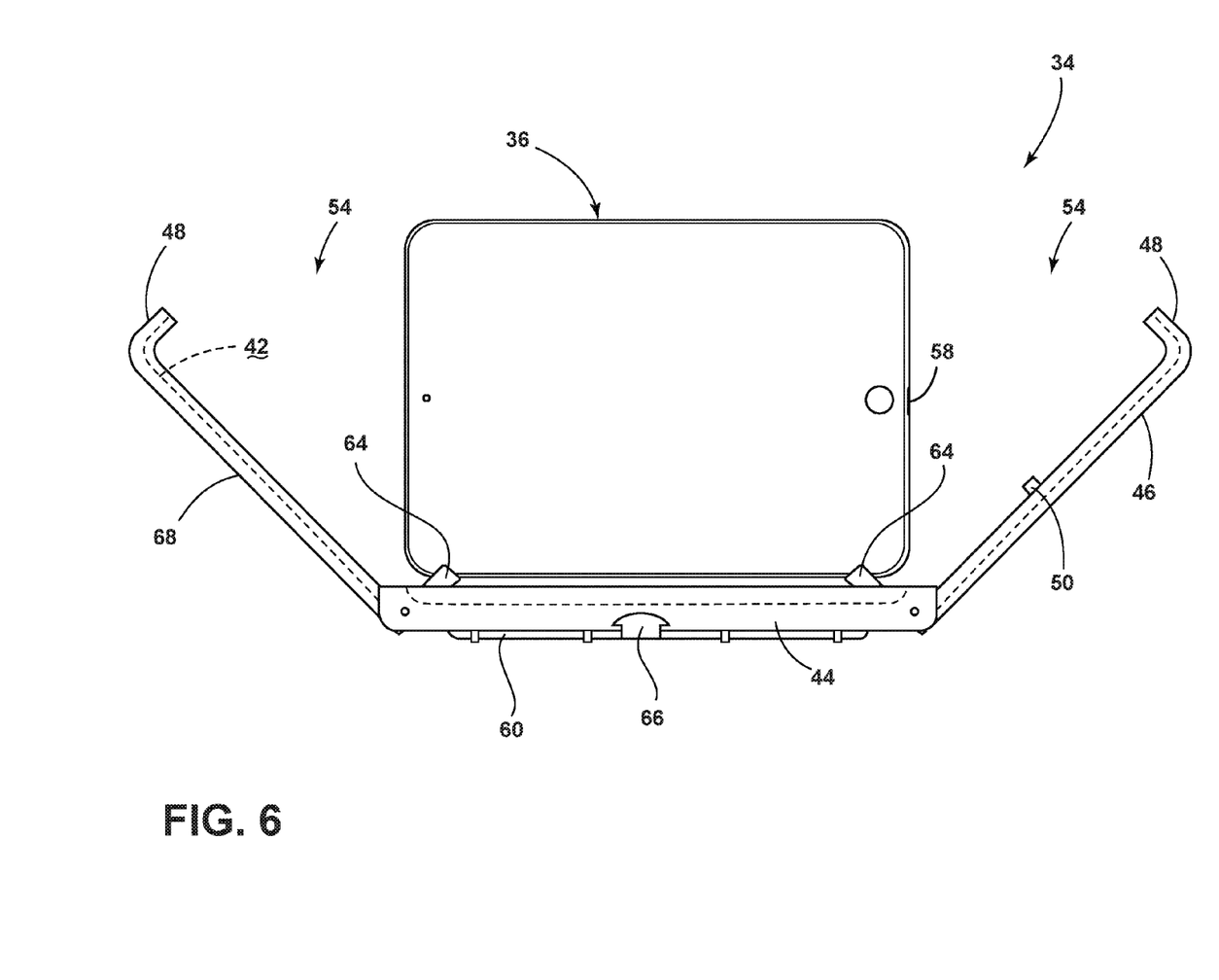
FIG. 6 is a perspective view of an embodiment of the mobile computer retainer that includes retaining arms shown in a second position not retaining a mobile computer.

Referring to FIG. 6, the first retaining arm 46 and the second retaining arm 68 of the mobile computer retainer 34 are illustrated as having pivoted to a second position 54. In this second position 54, the transversely extending end portion 48 is not parallel to the horizontal base 44. Thus, the mobile computer retainer 34 will not retain the mobile computer 36 and the vehicle operator 30 may remove the mobile computer 36.

Figure 7:
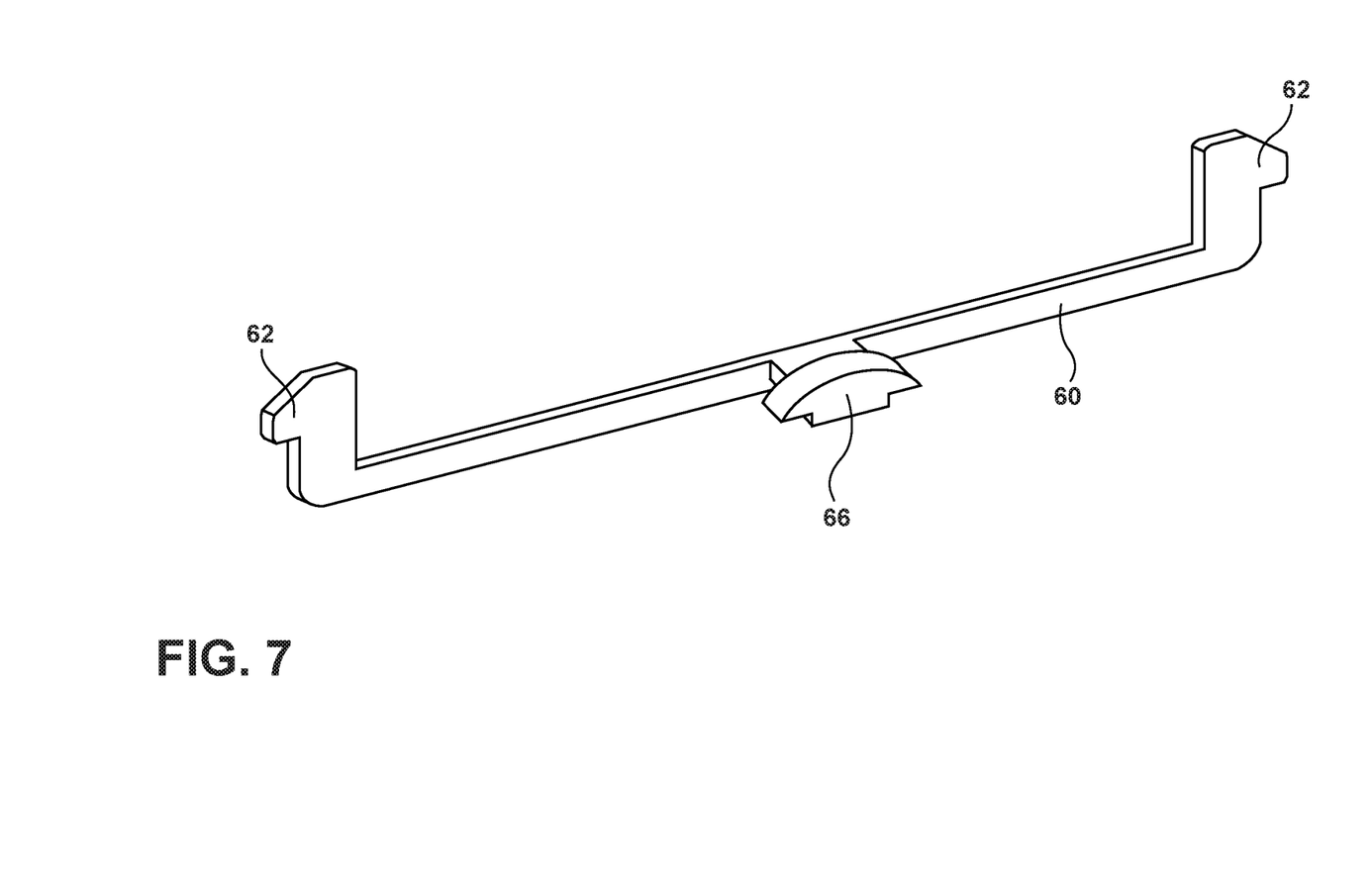
FIG. 7 is a perspective view of the retainer arm lock with release button used in the embodiment illustrated in FIGS. 5 and 6.

Referring to FIG. 7, a retainer arm lock 60 incorporated in the embodiment of a mobile computer retainer 34 of FIGS. 6 and 7 is illustrated. The retainer arm lock 60 includes a lip 62 on each end and a release button 66. One lip 62 extends over transversely extending pivot portion 64 (see FIG. 6) of the first retaining arm 46, when the first retaining arm 46 is in the first position 52 thus locking the first retaining arm 46 in the first position 52. Likewise, the other lip 62 can extend over transversely extending pivot portion 64 of the second retaining arm 68, when the second retaining arm 68 is in the first position 52 thus locking the second retaining arm 68 in the first position 52. The transversely extending pivot portion 64 is substantially parallel to the horizontal base 44, when the first retaining arm 46 and second retaining arm 68 are locked in the first position 52. When the vehicle operator desires to release the first retaining arm 46 and the second retaining arm 68 to move the first retaining arm 46 and the second retaining arm 68 to the second position 54, the vehicle operator 30 can depress the release button 66. That causes the retainer arm lock 60 to flex and the lips 62 to move toward the middle of the retainer arm lock 60, thus releasing the first retaining arm 46 and second retaining arm 68 and allowing the first retaining arm 46 and second retaining arm 68 to pivot and move to the second position 54.

Figure 8:
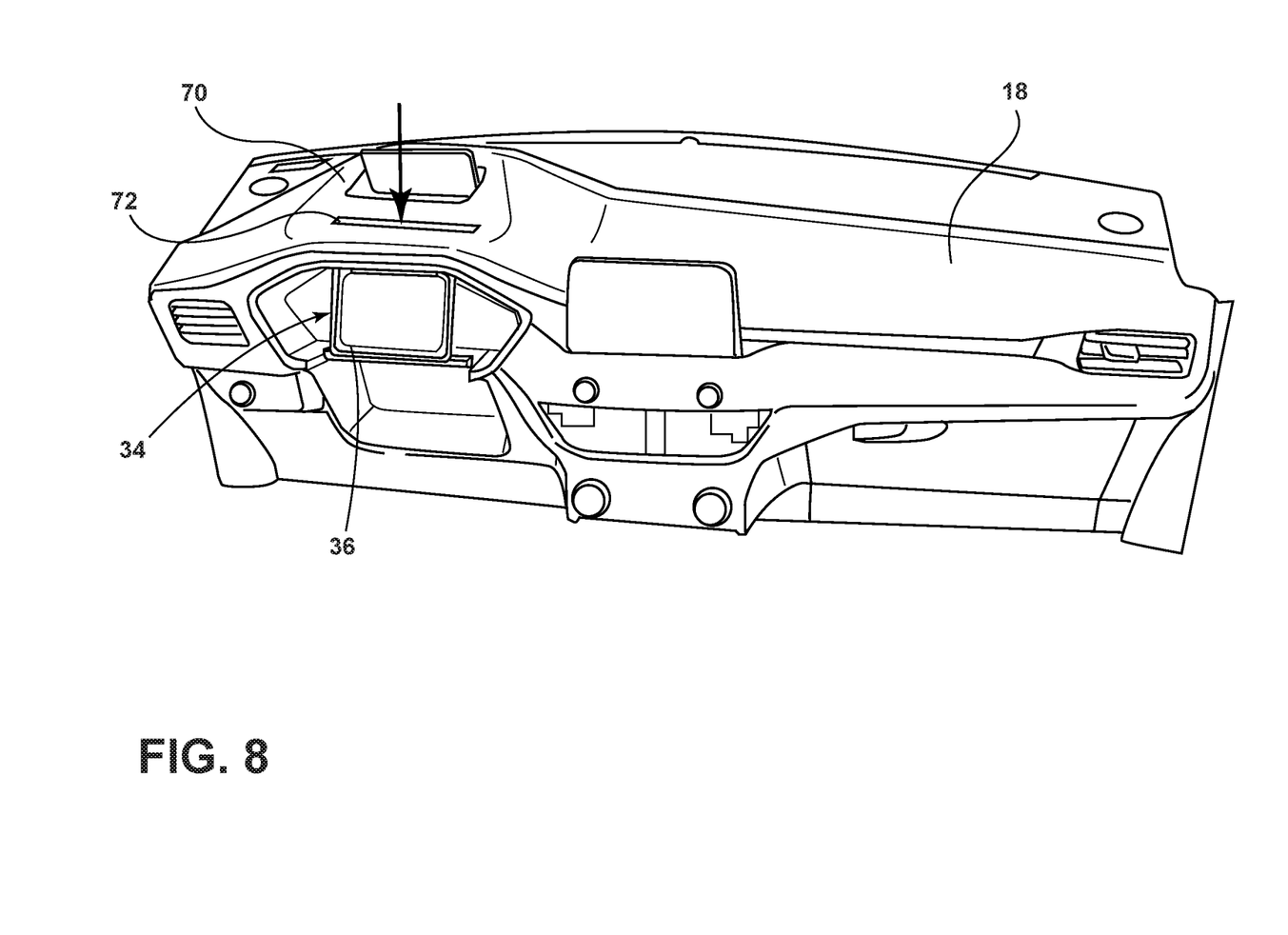
FIG. 8 is a perspective view of an embodiment of a dashboard with a top and an entrance through the top to a mobile computer retainer.

Referring to FIG. 8, an embodiment of a dashboard 18 comprising a top 70 is illustrated. In this embodiment, dashboard 18 at least partially encloses the mobile computer retainer 34. A vehicle operator 30 (see FIG. 2) can place the mobile computer 36 into the mobile computer retainer 34 by placing the mobile computer 36 through an entrance 72 through the top 70 of the dashboard 18. The dashboard 18 partially encloses the mobile computer retainer 34.

Figure 9:
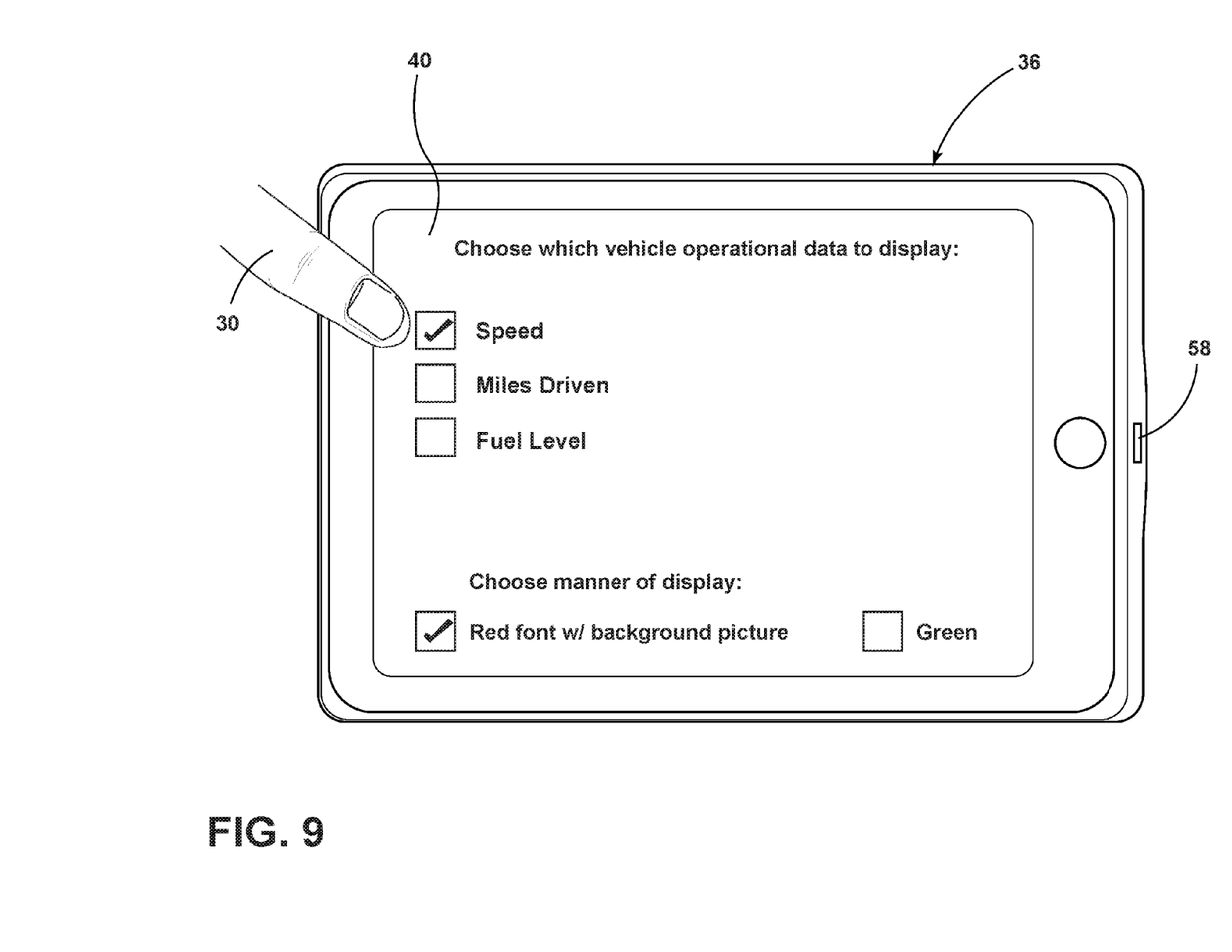
FIG. 9 is an illustration of a vehicle operator selecting the vehicle operational data that the mobile computer should display and the manner in which the data should be displayed according to a method of the present disclosure.

The above embodiments allow for a novel method of customizing the manner in which vehicle operational data 38 is displayed to a vehicle operator 30. The vehicle operator 30 selects a mobile computer 36, which includes a display screen 40 and contains application software that enables the display screen 40 to display vehicle operational data 38 that the vehicle operator 30 chooses. For example, as FIG. 9 illustrates, the vehicle operator 30 can select on the mobile computer 36 (such as by touching options displayed on the display screen 40 via the application software), the vehicle operational data 38 to be displayed and the manner in which it is displayed. The software allows the vehicle operator 30 to select any combination of vehicle operational data 38 to display; the software allows the display of any vehicle operational data 38 that the vehicle 10 collects via the vehicle operational data collection system 76.

Figure 10:
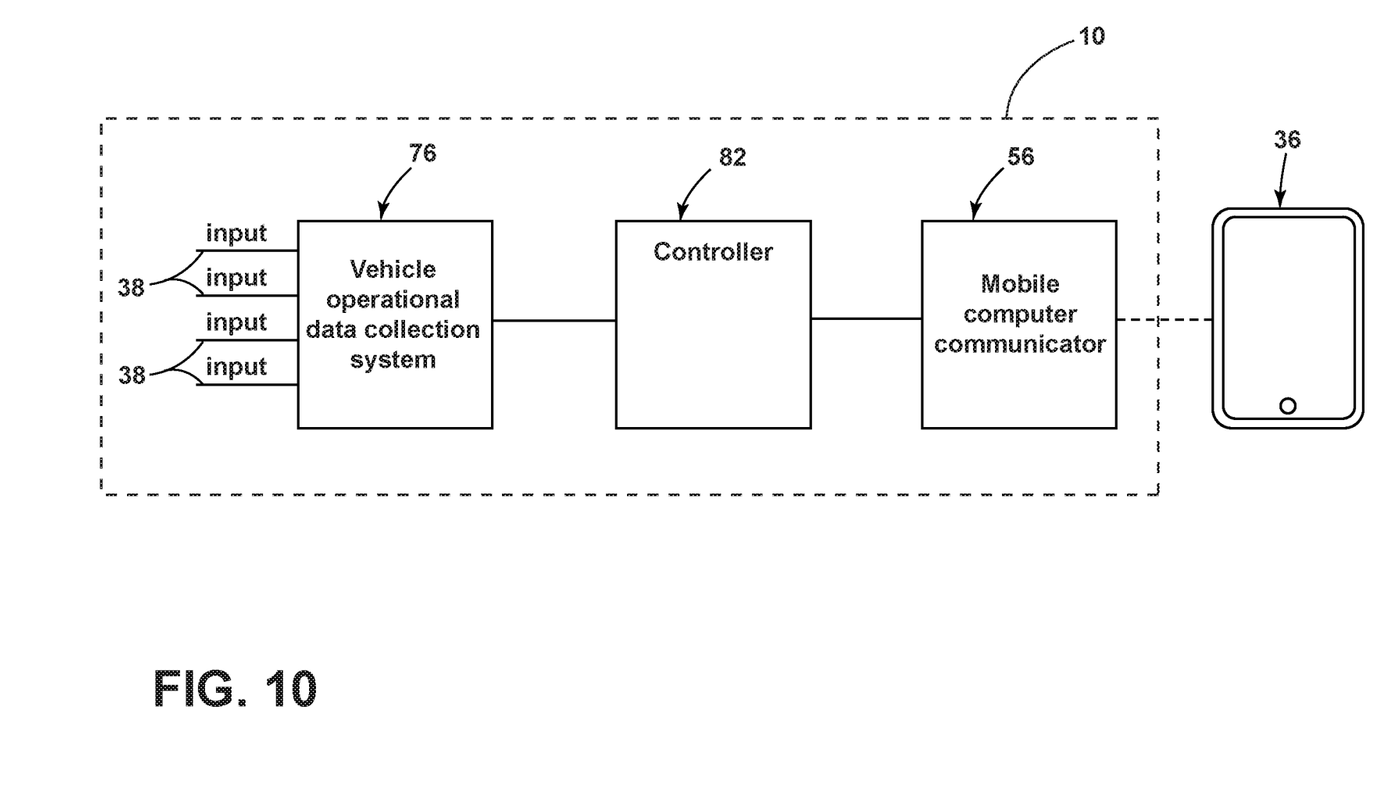
FIG. 10 is a block diagram illustrating how the vehicle operational data collection system collects and communicates to a mobile computer for display.

The vehicle operator 30 selects a vehicle 10 described above, such as a vehicle 10 comprising an operator's seat 12, a front 32, a mobile computer communicator 56, vehicle operational data collection system 76, and a mobile computer retainer 34 disposed between the operator's seat 12 and the front 32, directly forward the operator's seat 12. The vehicle operator 30 places the mobile computer 36 into the mobile computer retainer 34 disposed directly forward of the operator's seat 12 of the vehicle 10. The vehicle operator 30 allows the mobile computer communicator 56 of the vehicle 10 to communicate with the mobile computer 36. The mobile computer communicator 56 transmits the vehicle operational data 38 that the operational data collection system 76 collects to the mobile computer 36. The mobile computer 36 displays the vehicle operational data 38 on the display screen 40. The vehicle operator 30 views the vehicle operational data 38 on the display screen 40. More specifically, as illustrated in FIG. 10, the vehicle operational data collection system 76 in the vehicle 10 collects vehicle operational data 38 as input from various sensors, sends the data to a controller 82, which then transmits the data to the mobile computer communicator 56, which then transmits the data to the mobile computer 36.

The vehicle operator 30 can cause the vehicle 10 to move utilizing an energy source 78. In such a circumstance, the vehicle operational data 38 can include the speed at which the vehicle is moving, a distance at which the vehicle has moved, an amount of energy source within the vehicle, and so on. The vehicle operational data 38 that the vehicle operator 30 can select to display is only limited by the vehicle operational data 38 that the vehicle operational data collection system 76 collects.

In the event that the mobile computer retainer 34 includes at least one channel retaining member 42, the act of placing the mobile computer 36 into the mobile computer retainer 34 comprises placing the mobile computer 36 into the at least one channel retaining member 42. The at least one channel retaining member 42 thus partially surrounds the mobile computer 36.

In the event that the vehicle further includes a dashboard 18, the dashboard 18 can at least partially enclose the mobile computer retainer 34. The dashboard 18 can include a top 70 and an entrance 72 to the mobile computer retainer 34 disposed through the top 70. Thus, the act of placing the mobile computer 36 into the mobile computer retainer 34 comprises the act of inserting the mobile computer 36 through the entrance 72.

As described above, an embodiment of the mobile computer retainer 34 includes a horizontal base 44 and a first retaining arm 46 pivotally connected to the horizontal base 44. In such a circumstance, the act of placing the mobile computer 36 into the mobile computer retainer 34 can further include the acts of: placing the mobile computer 36 onto the transversely extending pivot portion 64 of the first retaining arm 46 when the first retaining arm 46 is in the second position 54; causing the first retaining arm 46 to move toward the first position 52; causing the charging port 50 to enter the charging port receiver 58; and causing the first retaining arm 46 to settle in the first position 52. When the first retaining arm 46 has settled in the first position 52, the transversely extending end portion 48 partially surrounds the mobile computer 36 to secure it into place.

In the embodiment described above where the vehicle includes a mobile computer communicator 56 to communicate with the mobile computer 36 comprising a radio wave receiver and a radio wave emitter, the act of allowing the mobile computer communicator 56 can include the radio wave emitter emitting radio waves to the mobile computer 36 and the mobile computer 36 emitting radio waves to the radio wave receiver.

When the vehicle operator 30 has finished operating the vehicle 10, the vehicle operator 30 can then remove the mobile computer 36 from the vehicle 10. Because the mobile computer 36 can be the mobile computer 36 that the vehicle operator 30 utilizes within the residence or office of the vehicle operator 30, such as to watch videos or surf the Internet, the vehicle operator 30 can then connect the mobile computer 36 to a computer network access point (such as a Wi-Fi connection operating in conjunction with a router) within a residence or office of the vehicle operator 30.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle comprising:
   an operator's seat; and
   a mobile computer retainer disposed directly forward of the operator's seat, the mobile computer retainer comprising at least one channel retaining member, a horizontal base, and a first retaining arm pivotally connected to the horizontal base, the first retaining arm comprising a transversely extending end portion.

2. The vehicle of claim 1 further comprising a steering column;
   wherein the mobile computer retainer is disposed above the steering column.

3. The vehicle of claim 1 further comprising a mobile computer communicator.

4. The vehicle of claim 3, the mobile computer communicator comprising a radio wave receiver and a radio wave emitter.

5. The vehicle of claim 3, the mobile computer communicator comprising a charging port.

6. The vehicle of claim 1, the first retaining arm further comprising a charging port for a mobile computer.

7. The vehicle of claim 1, the first retaining arm capable of pivoting to a first position and a second position, wherein, in the first position, the transversely extending end portion is substantially parallel to the horizontal base, and, in the second position, the transversely extending end portion is not parallel to the horizontal base.

8. The vehicle of claim 7, the mobile computer retainer further comprising a second retaining arm pivotally connected to the horizontal base, the second retaining arm comprising a transversely extending end portion,
   the second retaining arm capable of pivoting to the first position and the second position.

9. The vehicle of claim 8, the first retaining arm and the second retaining arm each comprising a transversely extending pivot portion, wherein, in the first position, the transversely extending pivot portion is substantially parallel to the horizontal base.

10. The vehicle of claim 1 further comprising a dashboard at least partially enclosing the mobile computer retainer, the dashboard comprising a top and an entrance to the mobile computer retainer disposed through the top.

11. A method of customizing the manner in which vehicle operational data is displayed to a vehicle operator, comprising:
    selecting a mobile computer comprising a display screen, application software enabling the display screen to display vehicle operational data of the vehicle operator's choosing, and a charging port receiver;

selecting on the mobile computer the vehicle operational data to be displayed and the manner in which it is displayed;

placing the mobile computer into a mobile computer retainer disposed directly forward of an operator's seat of a vehicle, the mobile computer retainer comprising a horizontal base and a first retaining arm pivotally connected to the horizontal base, the first retaining arm comprising a transversely extending end portion, a transversely extending pivot portion, and a charging port for the mobile computer;

the first retaining arm capable of pivoting to a first position and a second position, wherein, in the first position, the transversely extending end portion is substantially parallel to the horizontal base, and, in the second position, the transversely extending end portion is not parallel to the horizontal base;

allowing a mobile computer communicator of the vehicle to communicate with the mobile computer; and displaying the vehicle operational data on the display screen;

wherein placing the mobile computer into the mobile computer retainer further comprises:

pushing the mobile computer onto the transversely extending pivot portion when the first retaining arm is in the second position;

causing the first retaining arm to move toward the first position;

causing the charging port to enter the charging port receiver; and causing the first retaining arm to settle in the first position, wherein the transversely extending end portion partially surrounds the mobile computer to secure it into place.

12. The method of claim 11, further comprising
causing the vehicle to move,
wherein the vehicle operational data comprises a speed at which the vehicle is moving.

13. The method of claim 11, further comprising
causing the vehicle to move, wherein the vehicle further comprises an energy source,
wherein the vehicle operation data is at least one of the following: a speed at which the vehicle is moving; a distance which the vehicle has moved; and an amount of energy source within the vehicle.

14. The method of claim 11, the mobile computer retainer comprising at least one channel retaining member;
wherein placing the mobile computer into the mobile computer retainer comprises placing the mobile computer into the at least one channel retaining member so that the at least one channel retaining member partially surrounds the mobile computer.

15. The method of claim 11, the vehicle further comprising a dashboard at least partially enclosing the mobile computer retainer, the dashboard comprising a top and an entrance to the mobile computer retainer disposed through the top;

wherein placing the mobile computer into the mobile computer retainer comprises inserting the mobile computer through the entrance.

16. The method of claim 11, the mobile computer communicator comprising a radio wave receiver and a radio wave emitter;
wherein allowing the mobile computer communicator to communicate with the mobile computer comprises the radio wave emitter emitting radio waves to the mobile computer and the mobile computer emitting radio waves to the radio wave receiver.

17. The method of claim 11, further comprising the steps of
removing the mobile computer from the vehicle; and
connecting the mobile computer to a computer network access point located within a residence of the vehicle operator.

18. A vehicle comprising:
an operator's seat;
a mobile computer retainer disposed directly forward of the operator's seat, the mobile computer retainer including a horizontal base and a first retaining arm pivotally connected to the horizontal base, the first retaining arm including a transversely extending end portion forming a channel retaining member, the first retaining arm having a first position and a second position; and
a mobile computer with a display screen displaying vehicle operational data communicated to the mobile computer by the vehicle;
wherein, in the first position of the first retaining arm, the transversely extending end portion partially surrounds the mobile computer to retain the mobile computer; and
wherein, in the second position of the first retaining arm, the mobile computer retainer is not retaining the mobile computer.

19. The vehicle of claim 18,
the first retaining arm further including a transversely extending pivot portion; and
the mobile computer retainer further including a retainer arm lock, the retainer arm lock including a lip and a release button capable of being depressed;
wherein, in the first position of the first retaining arm, the lip of the retainer arm lock extends over the transversely extending pivot portion of the first retaining arm, locking the first retaining arm in the first position; and
wherein, when the release button of the retainer arm lock is depressed, the first retaining arm is not locked in the first position and can move to the second position.

20. The vehicle of claim 18,
the first retaining arm including a charging port; and
the mobile computer including a charging port receiver;
wherein, in the first position, the charging port receiver receives the charging port, providing a communicative and charging connection between the vehicle and the mobile computer.

* * * * *